United States Patent
Albert et al.

(10) Patent No.: US 7,104,565 B1
(45) Date of Patent: Sep. 12, 2006

(54) PACKAGED WHEELBARROW AND ASSOCIATED METHOD

(75) Inventors: Barry R. Albert, Dillsburg, PA (US); Michael J. Tomchak, Harrisburg, PA (US)

(73) Assignee: Ames True Temper, Inc., Camp Hill, PA (US)

( * ) Notice: Subject to any disclaimer, the term of this patent is extended or adjusted under 35 U.S.C. 154(b) by 195 days.

(21) Appl. No.: 10/637,473

(22) Filed: Aug. 8, 2003

(51) Int. Cl.
*B62B 1/20* (2006.01)

(52) U.S. Cl. ................. 280/653; 280/47.31; 280/47.18

(58) Field of Classification Search ........... 280/47.131, 280/47.17, 47.24, 47.26, 47.31, 47.33, 652, 280/653, 654, 659, 47.12, 47.32; 180/19.1–19.3; 298/2, 3; D34/16
See application file for complete search history.

(56) References Cited

U.S. PATENT DOCUMENTS

| | | | | |
|---|---|---|---|---|
| 930,959 | A | * | 8/1909 | Halsup ..................... 280/47.31 |
| 977,056 | A | | 11/1910 | Verplanck |
| 1,026,625 | A | | 6/1912 | Stebbins |
| 1,427,262 | A | * | 8/1922 | Charriot ................... 280/47.31 |
| 1,526,935 | A | * | 2/1925 | Roemer .................... 280/47.31 |
| 2,242,171 | A | | 5/1941 | Boyle |
| 2,588,503 | A | | 3/1952 | Dwyer |
| 2,800,335 | A | | 7/1957 | Clapp |
| 3,029,984 | A | | 4/1962 | Cooper |
| 3,170,707 | A | * | 2/1965 | Millar et al. ............. 280/47.31 |
| 3,235,281 | A | * | 2/1966 | Faucette, Jr. ............. 280/47.31 |
| 3,620,364 | A | | 11/1971 | Lynch |
| 3,722,904 | A | | 3/1973 | Puckett |
| 4,190,260 | A | | 2/1980 | Pearce |
| 4,353,596 | A | | 10/1982 | Gibson |
| 4,758,010 | A | | 7/1988 | Christie |
| 4,854,601 | A | * | 8/1989 | Herndon .................. 280/47.31 |
| 4,991,716 | A | | 2/1991 | Havlovitz |
| 5,601,298 | A | | 2/1997 | Watanabe |
| 6,851,701 | B1 | * | 2/2005 | Tomchak et al. .......... 280/653 |
| 2002/0113388 | A1 | * | 8/2002 | Robinson ................. 280/47.31 |
| 2004/0256838 | A1 | * | 12/2004 | Shapiro ..................... 280/653 |

FOREIGN PATENT DOCUMENTS

FR 2511978 * 3/1983

* cited by examiner

*Primary Examiner*—Jeff Restifo
(74) *Attorney, Agent, or Firm*—Brij K. Agarwal; Eckert Seamans Cherin & Mellott, LLC

(57) ABSTRACT

An improved wheelbarrow in a disassembled condition is disposed in a carton that conforms substantially with the orthogonal dimensions of a tray of the wheelbarrow. The other components of the wheelbarrow comprise a frame subassembly, a pair of handle members, a wheel, an axle, and a number of fasteners, and these other components are disposed substantially entirely within an interior of the tray within the carton, such as during shipping and storage. The wheelbarrow is assembled by removing the wheelbarrow components from the carton, pivoting a pair of riser members of the frame subassembly with respect to a frame member of the frame subassembly, and attaching the pair of handle members to the frame member and to the riser members. The tray and the wheel are mounted to the riser members.

11 Claims, 8 Drawing Sheets

PACKAGED WHEELBARROW AND ASSOCIATED METHOD

BACKGROUND OF THE INVENTION

1. Field of the Invention

The present invention relates generally to wheelbarrows and, more particularly to an apparatus and method wherein a disassembled wheelbarrow is provided in a relatively small package and is easily assembled.

2. Description of the Related Art

Numerous wheelbarrows of numerous different configurations are known. One fact that is particularly acknowledged is that wheelbarrows are generally large and bulky. Such bulkiness is due, at least in part, to factors such as the need for a tray that will carry a sufficiently large payload, the need for a frame that rollably supports the tray on a grade, and one or more handles that are spaced from the tray and that can be held by a user. As a result, the components of a wheelbarrow occupy a significant space, even when in an unassembled condition.

There can be no doubt that the disassembled components of an article, such as a wheelbarrow, can be packaged in a small container depending upon how small one chooses to make each of the individual components. Small components typically are assembled to form a small structure unless many small components are provided and are assembled to form a relatively larger structure. The assembly of an object out of a relatively greater number of components will often be relatively more complex than the assembly of a similar object made up of fewer components. It is also understood that a given structure often is stronger as a unitary member than when formed out of many smaller pieces connected together, such as in the way a single beam would generally be stronger than a similarly sized structure assembled out of numerous components.

For the most part, therefore, the different goals of ease of assembly, strength, and minimized packaged size would appear to mutually compete with one another. A need thus exists for a strong wheelbarrow that has a relatively small packaged profile yet is easy to assemble, along with an associated method.

Small packaging of a disassembled wheelbarrow is highly desirable since disassembled wheelbarrows often occupy two separate cartons. One carton includes the relatively longer components such as frame and handle pieces, and a separate carton carries a wheelbarrow tray and other components. Such packaging of a disassembled wheelbarrow in multiple cartons is undesirable since a consumer must correctly pick both of the cartons, often from among other cartons associated with other wheelbarrows, and must carry the two cartons to a checkout counter. This is cumbersome and subject to an incorrect selection of one of the packages by the consumer. A need thus also exists for a wheelbarrow that is strong, easy to assemble, and is packaged within a single container when in a disassembled condition.

SUMMARY OF THE INVENTION

An improved wheelbarrow and associated method meet these and other needs. An improved wheelbarrow in a disassembled condition is disposed in a carton that conforms substantially with the orthogonal dimensions of a tray of the wheelbarrow. The other components of the wheelbarrow comprise a frame subassembly, a pair of handle members, a wheel, an axle, and a number of fasteners, and these other components are disposed substantially entirely within an interior of the tray within the carton, such as during shipping and storage. The wheelbarrow is assembled by removing the wheelbarrow components from the carton, pivoting a pair of riser members of the frame subassembly with respect to a frame member of the frame subassembly, and attaching the pair of handle members to the frame member and to the riser members. The tray and the wheel are mounted to the riser members.

Accordingly, an aspect of the present invention it is to provide an improved wheelbarrow that is relatively strong.

Another aspect of the present invention is to provide an improved wheelbarrow that is easy to assemble.

Another aspect of the present invention is to provide an improved wheelbarrow which, in a disassembled condition, fits into a relatively small package.

Another aspect of the present invention is to provide an improved wheelbarrow having a minimal number of components that are still configured to fit substantially in their entireties within an interior of a wheelbarrow tray when in a disassembled condition.

Another aspect of the present invention is to provide an improved wheelbarrow which is provided in a single package when in a disassembled condition.

Another aspect of the present invention is to provide an improved wheelbarrow which, when in a disassembled condition, can fit within a parallelepiped carton that conforms substantially to the orthogonal dimensions of a wheelbarrow tray.

Another aspect of the present invention is to provide an improved method of forming a wheelbarrow wherein the wheelbarrow can be assembled from its various components with minimal effort.

Another aspect of the present invention is to provide an improved method of forming a wheelbarrow wherein the assembly of the wheelbarrow includes pivoting pivotably connected together components of a pre-assembled subassembly.

Another aspect of the present invention is to provide a method of forming a wheelbarrow, in which the general nature of the method can be stated as including repositioning a wheel, a pair of handle members, and a frame subassembly having a pair of riser members pivotably mounted to a frame member from a position disposed substantially entirely within an interior of a wheelbarrow tray to a position disposed substantially at the exterior of the wheelbarrow tray, pivoting with respect to the frame member the pair of riser members from an initial position to an assembly position, connecting one of the handle members with the frame member and one of the riser members, connecting the other of the handle members with the frame member and the other of the riser members, attaching the wheel to one of the frame member and the pair of riser members, and mounting the wheelbarrow tray to the pair of riser members.

Another aspect of the present invention is to provide a method of forming a wheelbarrow, in which the general nature of the method can be stated as including providing a wheelbarrow tray disposed within a carton that corresponds substantially with the orthogonal dimensions of the wheelbarrow tray, providing a wheel, a pair of handle members, and a frame subassembly having a pair of riser members pivotably mounted to a frame member disposed within an interior of the tray within the interior of the carton, removing from the carton the wheelbarrow tray, the wheel, the pair of handle members, and the frame subassembly, removing from the wheelbarrow tray the wheel, the pair of handle members, and the frame subassembly, pivoting with respect to the frame member the pair of riser members from an initial position to an assembly position, connecting one of the handle members with the frame member and one of the riser members, connecting the other of the handle members with the frame member and the other of the riser members, attaching the wheel to one of the frame member and the pair of riser members, and mounting the wheelbarrow tray to the pair of riser members.

Still another aspect of the present invention is to provide a disassembled and packaged wheelbarrow, the general nature of which can be stated as including a wheelbarrow tray having an interior, a wheel, a pair of handle members, a frame subassembly, and a carton. The frame subassembly has a pair of riser members pivotably mounted to a frame member. The wheel, the pair of handle members, and the frame subassembly are disposed substantially within the interior of the wheelbarrow tray. The carton has an interior that conforms substantially to the orthogonal dimensions of the wheelbarrow tray. The wheelbarrow tray, the wheel, the pair of handle members, and the frame subassembly are disposed within the interior of the carton.

BRIEF DESCRIPTION OF THE DRAWINGS

A further understanding of the invention can be gained from the following Description of the Preferred Embodiment when read in conjunction with the accompanying drawings in which.

Similar numerals refer to similar parts throughout the specification.

DESCRIPTION OF THE PREFERRED EMBODIMENT

Figure 7:
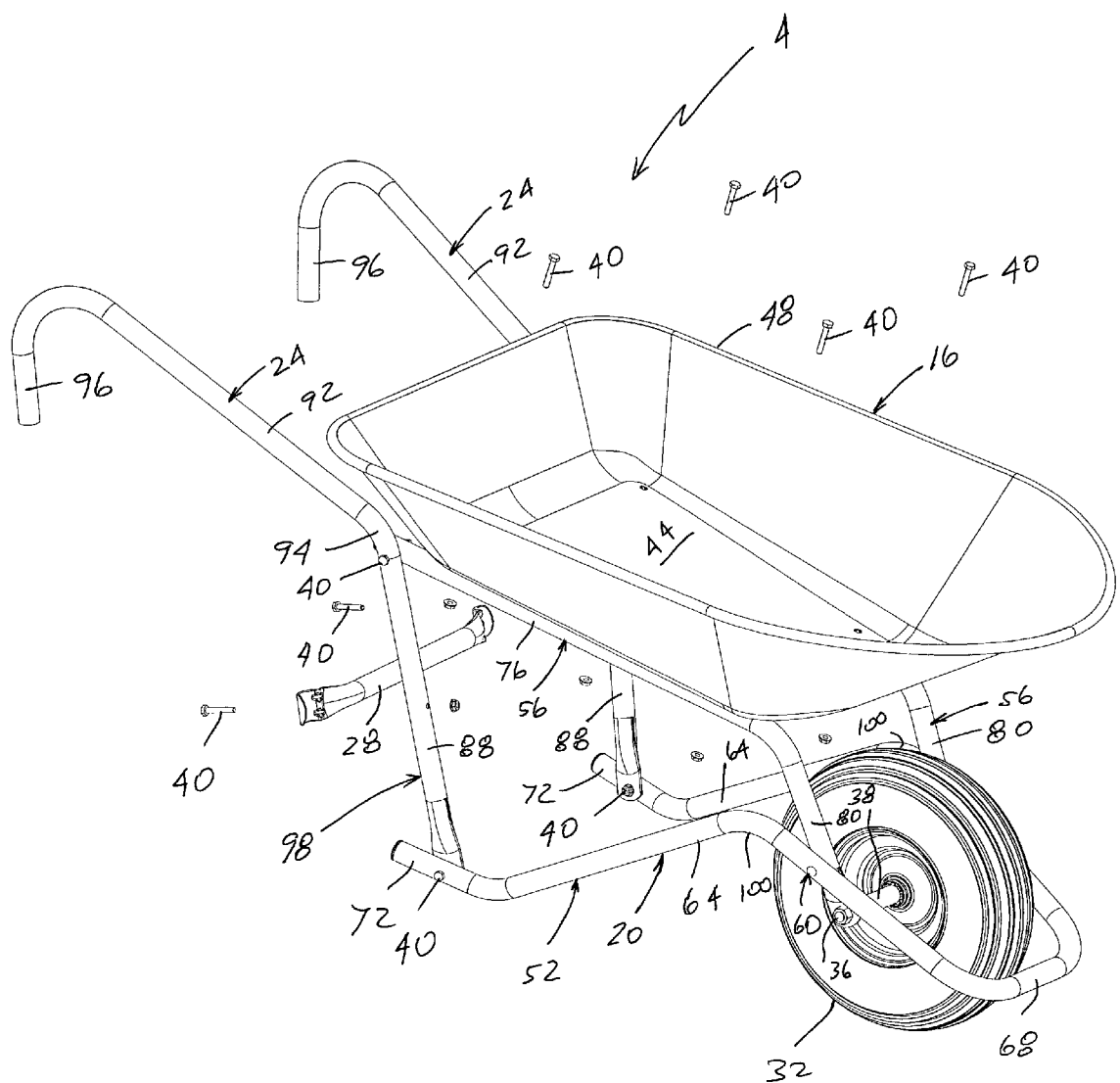
FIG. 7 is a fourth operational view depicting assembly of the wheelbarrow.

An improved wheelbarrow 4 in accordance with the present invention is depicted in a substantially assembled condition in FIG. 7. The wheelbarrow 4 is also depicted in a disassembled condition in FIGS. 1–3 and is depicted in FIGS. 2 and 2A as being packaged in accordance with the present invention. The wheelbarrow 4 is depicted at least partially in FIGS. 4–7 during an assembly method in accordance with the present invention.

Figure 1:
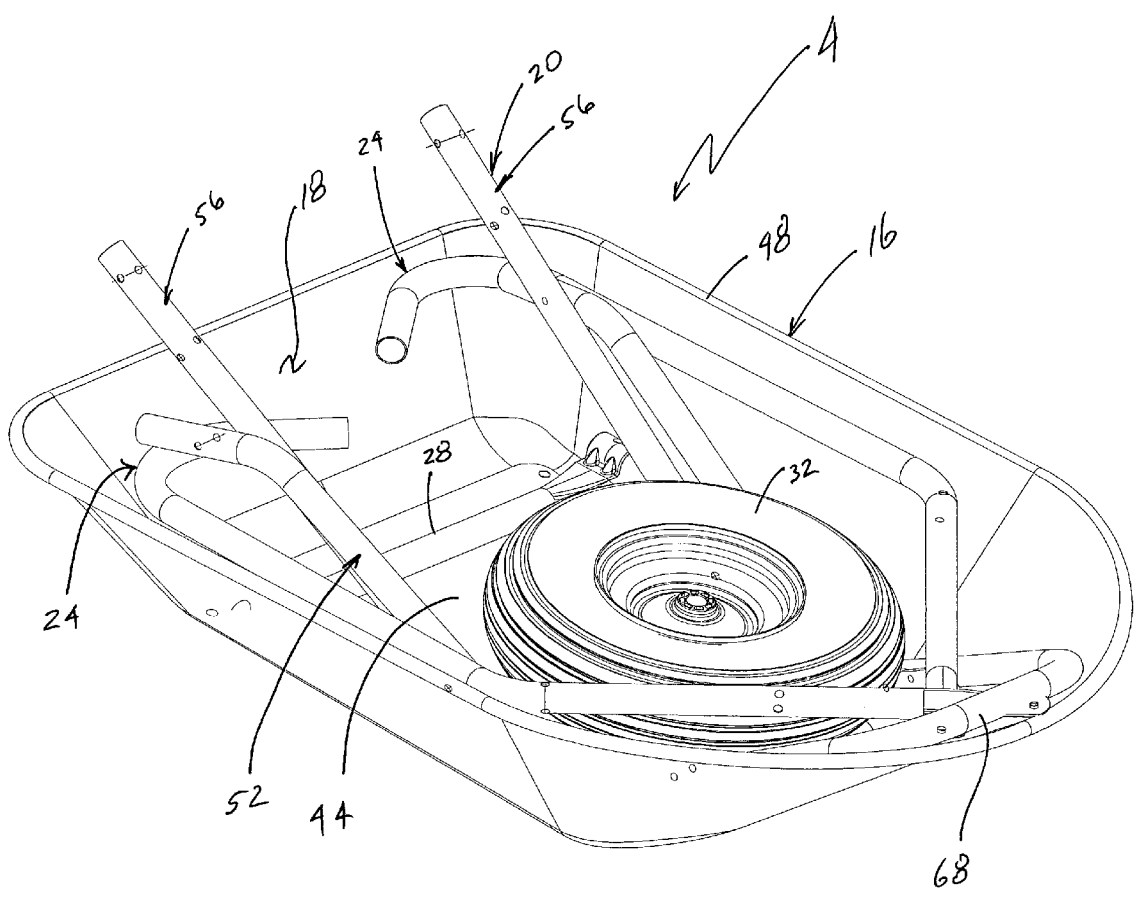
FIG. 1 is a perspective view of an improved wheelbarrow in a disassembled condition.
Figure 2:
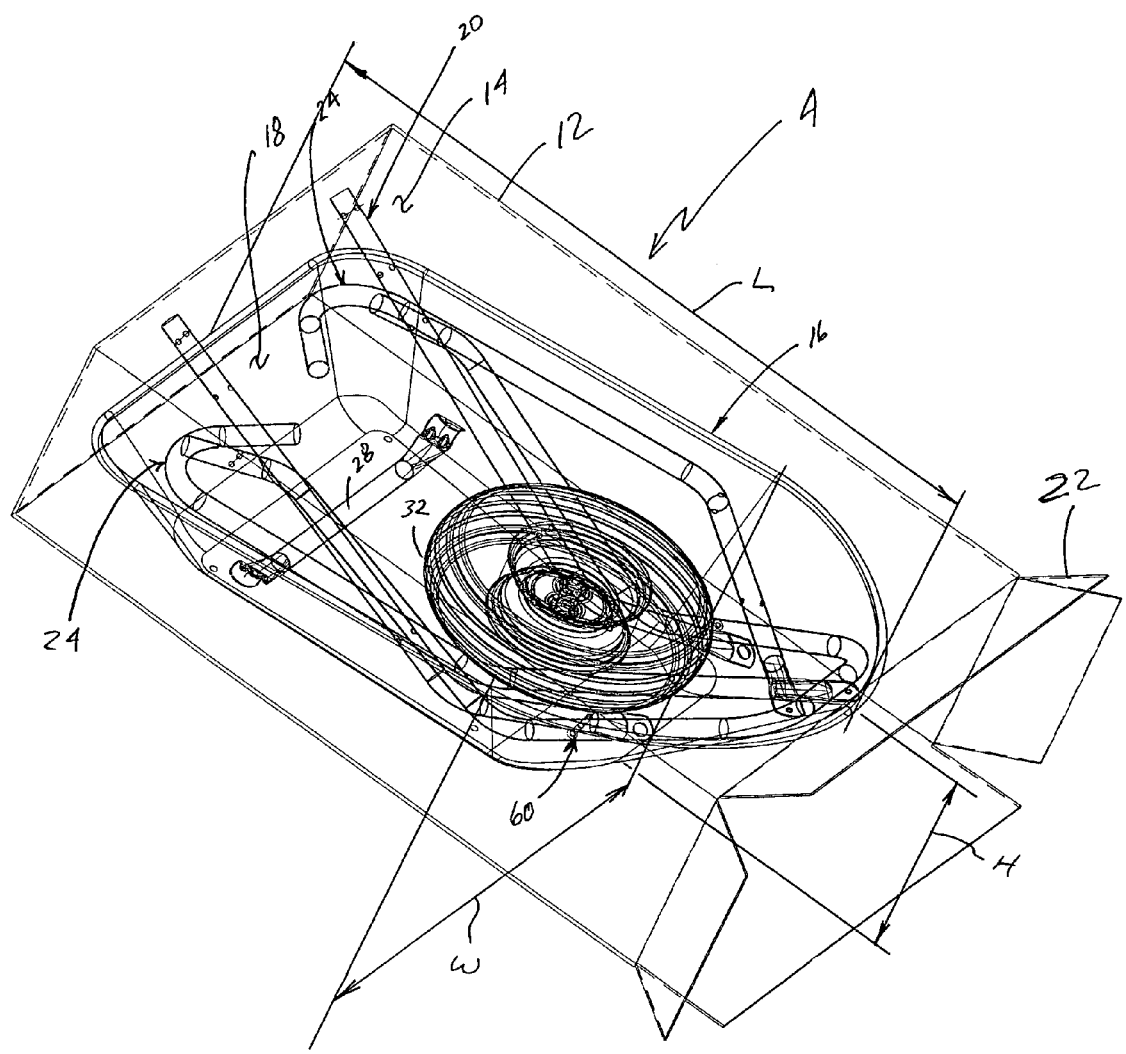
FIG. 2 is a view similar to FIG. 1 except depicting the disassembled wheelbarrow packaged within a carton.
Figure 2A:
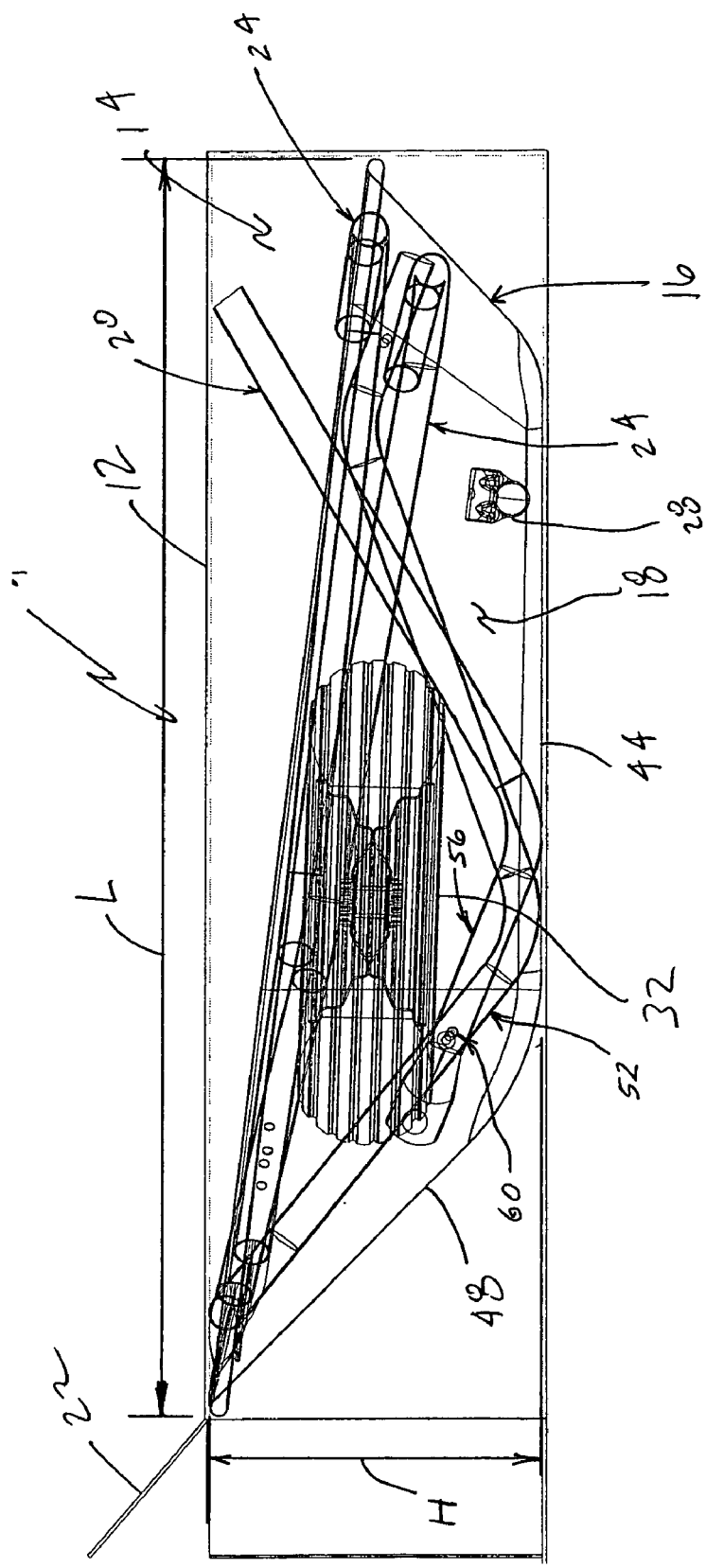
FIG. 2A is a side view of the disassembled wheelbarrow packaged within the carton.

As can be seen in FIGS. 1–2A, all of the various disassembled components of the wheelbarrow 4 can be disposed within a rigid wheelbarrow tray 16 of the wheelbarrow 4, and more specifically are disposed substantially entirely within an interior 18 of the tray 16.

As can be understood from FIGS. 2 and 2A, the tray 16 and the various other components of the wheelbarrow 4 that are disposed substantially entirely within the interior 18 of the tray 16 are together received within a carton 12. In the exemplary depicted embodiment, the carton 12 is of a parallelepiped configuration and conforms substantially to the orthogonal dimensions of the tray 16. As used herein, the expression "parallelepiped" and variations thereof shall refer broadly to a six-faced polyhedron, all of the faces of which are parallelograms lying in pairs of parallel planes, it being noted that the parallelograms may or may not, in whole or in part, be rectangular. The carton 12 includes an interior 14 that is also of a corresponding parallelepiped configuration and conforms substantially to the orthogonal dimensions of the tray 16. As used herein, the expression "orthogonal" and variations thereof shall refer broadly to a state of being mutually substantially perpendicular. It is noted that the carton 12 is depicted herein in an open condition with a number of carton flaps 22 pivoted to an open position.

The tray 16 includes a bottom wall 44 and a perimeter wall 48, and in the depicted exemplary embodiment of the wheelbarrow 4, the orthogonal dimensions of the tray 16 could be measured along a pair of axes oriented substantially parallel with the bottom wall 44 and extending in both longitudinal and transverse directions, as well as along a third axis extending perpendicular to the bottom wall 44. Due to the particular shape of the tray 16, a certain amount of space exists between the tray 16 and the interior 14 of the carton 12. As such, the expressions employed herein to the effect that the various components of the wheelbarrow 4 are "disposed substantially entirely within an interior of a wheelbarrow tray" and variations thereof may be broadly construed to refer generally to the various disassembled components of the wheelbarrow 4 being disposed within the interior 18 of the tray 16 and at most protruding only slightly from the interior 18 to the extent that the tray 16 and the other disassembled components of the wheelbarrow 4 can still be received within the interior of a parallelepiped carton conforming substantially to the orthogonal dimensions of the tray.

Figure 3:
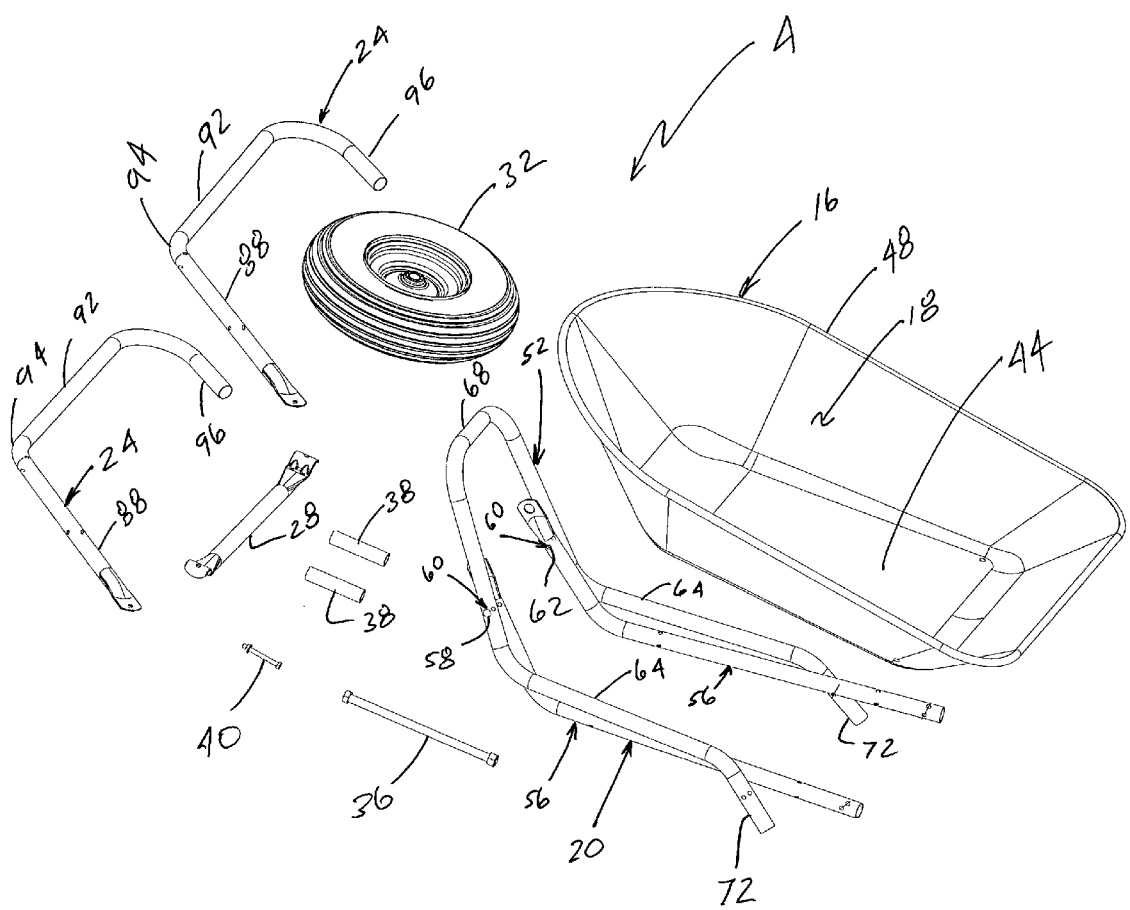
FIG. 3 is a view of the various disassembled components of the wheelbarrow.

As can be seen from FIG. 3, the disassembled wheelbarrow 4 includes, in addition to the tray 16, a frame subassembly 20, a pair of handle members 24, a cross brace 28, a wheel 32, an axle 36, a pair of wheel spacers 38, and a number of fasteners 40. For purposes of clarity FIG. 3 depicts only a single fastener 40, it being understood that the wheelbarrow 4 includes additional fasteners 40. As mentioned above, these components are configured to fit substantially within the interior 18 of the tray 16, and additionally are configured to be easily assembled in forming the assembled wheelbarrow 4.

Figure 4:
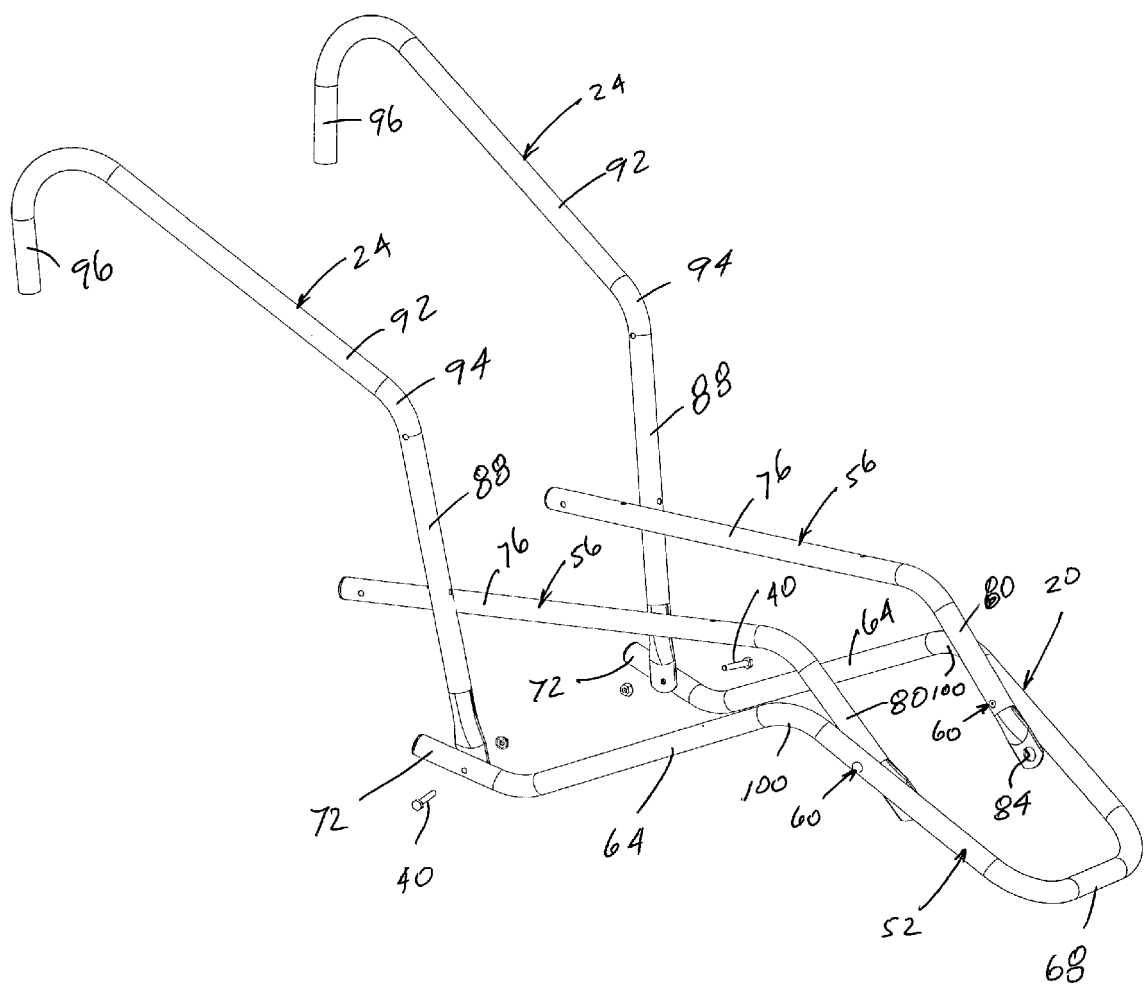
FIG. 4 is a first operational view depicting assembly of the wheelbarrow.
Figure 5:
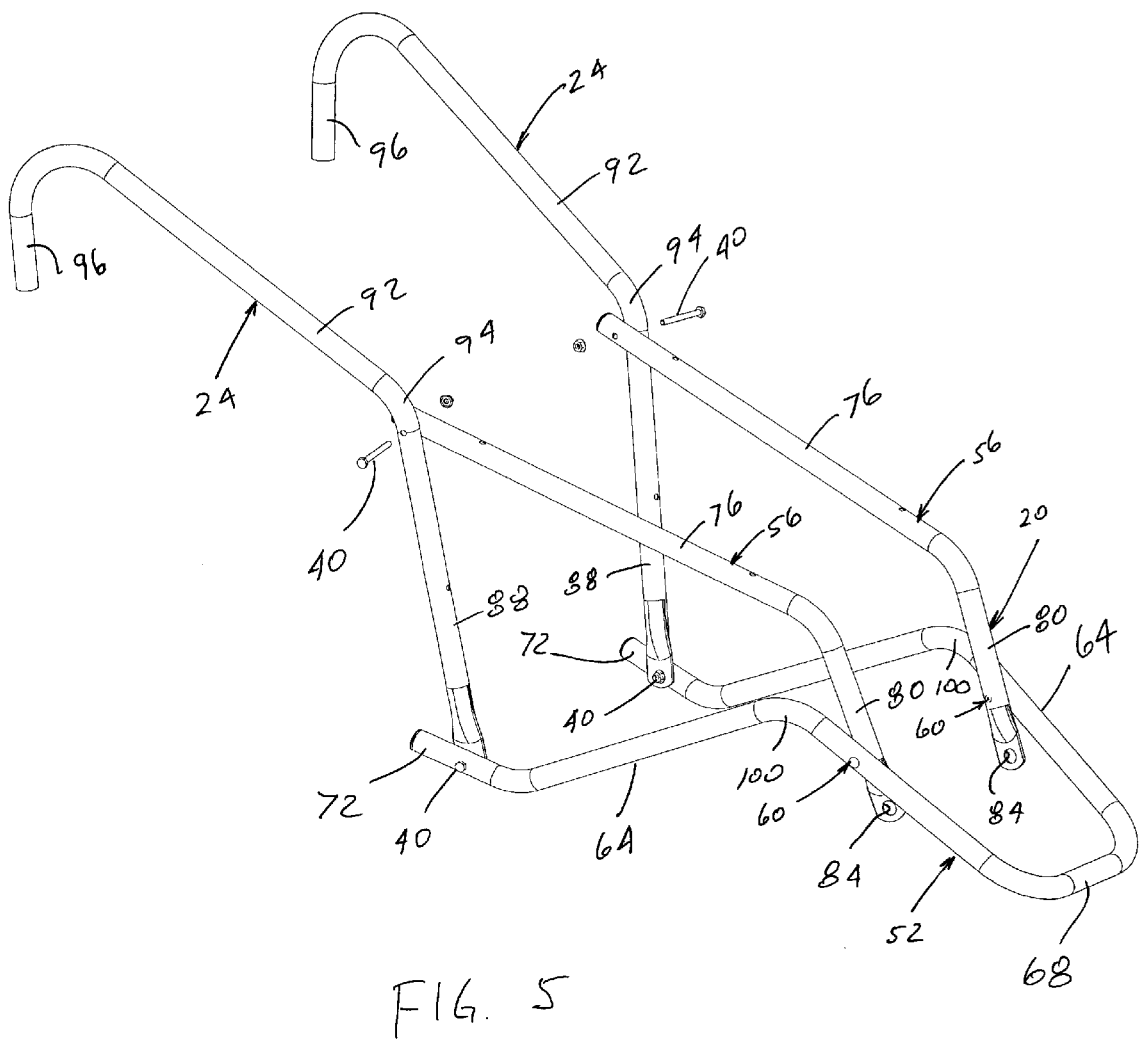
FIG. 5 is a second operational view depicting assembly of the wheelbarrow.
Figure 6:
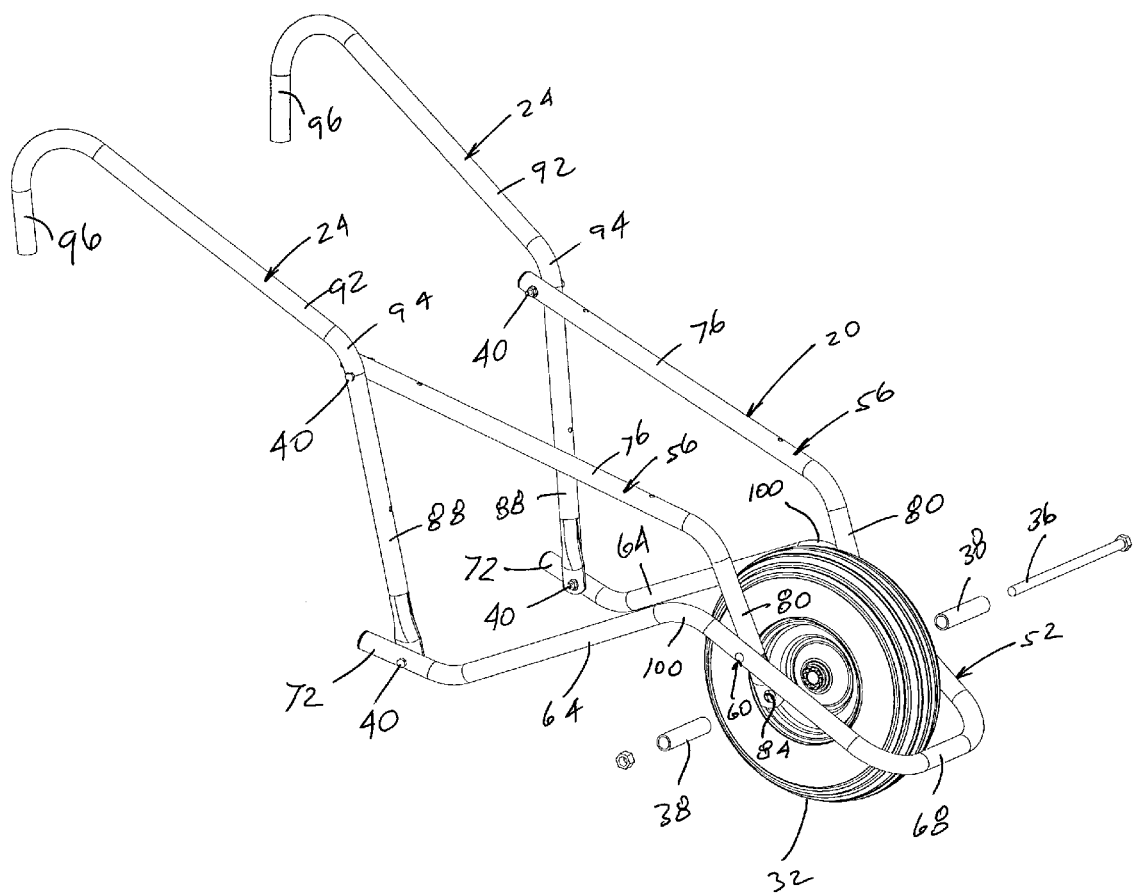
FIG. 6 is a third operational view depicting assembly of the wheelbarrow.

As can be seen in FIGS. 4 and 5, the frame subassembly 20 includes a frame member 52 and a pair of riser members 56. The riser members 56 are pivotably connected with the frame member 52 with a pair of rivets 60. Each rivet 60 includes a manufactured head 58 disposed against the frame member 52 and a clinch head 62 disposed against the corresponding riser member 56. The frame member 52 includes a pair of legs 64 and a nose guard 68, with the nose guard 68 extending between and connecting together the legs 64. Each leg 64 terminates at a foot 72 that can be disposed on a grade to support the wheelbarrow 4 in a condition where the tray 16 can be loaded with a payload.

Each riser member 56 includes a support portion 76 and an elevating portion 80 connected together. The rivets 60 connect the elevating portion 80 with the legs 64. Each riser member 56 includes an axle seat 84 near the free end of the elevating portion 80.

The handle members in 24 each include a lower portion 88, an upper portion 92, and a hand grip 96. The lower and upper portions 88 and 92 are elongated members connected together at a bend 94. The hand grip 96 is a curved member extending from the upper portion 92.

An exemplary method in accordance with the present invention of assembling the wheelbarrow 4 is depicted generally in FIGS. 4–7. The disassembled wheelbarrow 4 is removed from the interior 14 of the carton 12. Also, the frame subassembly 20, the handle members 24, the cross brace 28, the wheel 32, the axle 36, the wheel spacers 38, and the fasteners 40 are removed from the interior 18 of the tray 16.

As can be seen in FIG. 4, the handle members 24 are connected with the frame member 52. More specifically, the free ends of the lower portion 88 are connected with the feet 72 using a pair of the fasteners 40 extending through appropriate holes formed in the structures. While the exemplary fasteners 40 are depicted herein as being threaded bolts and cooperative nuts, it is understood that other types of fasteners can be employed such as other threaded fasteners like screws and non-threaded fasteners such as rivets, as well as other types of fasteners.

The riser members 56 are pivoted from an initial position, such as is shown in FIG. 4, to an assembly position, such as is shown in FIG. 5, and are connected with the handle members 24 with more of the fasteners 40. In the exemplary embodiment depicted herein, the free ends of the support portions 76 are connected with the lower portions 88 of the handle members 24 in the vicinity of the bends 94, although it is noted that the riser members 56 could be connected with the handle members 24 at other locations thereof without departing from the concept of the present invention.

The riser members 56 are pivoted between the initial and assembly positions inasmuch as the riser members 56 are pivotably mounted to the frame member 52. Such pivotable mounting, which is provided by the rivets 60, facilitates assembly of the wheelbarrow 4 since the rivets 60 represent two additional fasteners that need not be installed by a user, and that rather are installed at the factory. Despite such pivotable connection of the riser members 56 with the frame member 52, the frame subassembly 20 is nevertheless disposed substantially entirely within the interior 18 of the tray 16 when in the carton 12, which advantageously promotes rapid assembly while still providing a relatively small packaged size for the wheelbarrow 4.

The wheel 32 can be mounted to the riser members 56 by receiving the axle 36 through the axle seats 84 in the riser members 56, through the wheel spacers 38, and through an appropriate hole in the wheel 32. Each wheel spacer 38 is interposed between the wheel 32 and one of the axle seats 84, with the wheel 32 being interposed between the wheel spacers 38. It is understood that in other embodiments the wheel 32 potentially could be mounted to the frame member 52 depending upon the configuration thereof.

The tray 16 is mounted to the riser members 56 with four of the fasteners 40. Specifically, the bottom wall 44 is connected with each support portion 76 at both the rear and the front thereof, i.e. in the vicinity of the free end of each support portion 76 and in the vicinity of the intersection between the support portion 76 and the elevating portion 80. The support portions 76 thus serve as longitudinal members that support the tray 16. The use of two of the fasteners 40 with each of the support portions 76 securely attaches the tray 16 to the frame subassembly 20 and also causes the tray 16 to function somewhat in the fashion of a structural member that serves to stiffen the frame subassembly 20 after assembly of the wheelbarrow 4.

The cross brace 28 is connected with both of the handle members 24 with another pair of the fasteners 40. In the depicted exemplary embodiment the cross brace 28 extends between the lower portion 88 at approximately the midpoint thereof. It is understood that the cross brace 28, and its attachment with the handle members 24 or other structures, can be of different configurations without departing from the concept of the present invention. The cross brace 28 stiffens the assembled wheelbarrow 4 and, in cooperation with the stiffening aspect of the tray 16, provides the wheelbarrow 4 with an overall relatively rigid support structure.

In this regard, it can be seen that the frame subassembly 20, the handle members 24, the cross brace 28, and the bottom wall 44 of the tray 16 assembled together form a frame 98 of the wheelbarrow 4 that rigidly supports the tray 16 in a desired position. As mentioned above, the frame 98 is advantageously formed of a minimal number of components that can be easily assembled together with a minimal number of fasteners 40. The minimal number of components in the frame 98, as well as the minimal number of fasteners 40, also contributes to the overall strength and stiffness of the frame 98 and of the overall wheelbarrow 4. The wheelbarrow 4 thus is configured to achieve an advantageous compromise between the number and size of components, the ease of assembly, and packaged size of the wheelbarrow 4.

As is best shown in FIG. 7, the legs 64 each extend from the foot 72 upward to a bend 100 at which point the leg 64 extends generally downwardly toward the nose guard 68. As can be understood from FIG. 1, the intersection between the support portion 76 and the elevating portion 80 of the riser number 56 at the bend 94 is angled in a fashion similar to the bends 100 of the legs 64. Such selective bending facilitates the frame subassembly 20 being received substantially within the interior 18 of the tray 16. By desirably configuring the elevating portions 80 of the riser members 56, as well as their pivotable connection with the legs 64, the wheel 32 can be desirably positioned to dispose the tray 16 at a desirable height with respect to the grade. It thus can be seen that teachings herein regarding the exemplary frame 98 can be varied to provide wheelbarrows of different configurations without departing from the concept of the present invention.

The wheelbarrow 4 in accordance with the present invention is advantageously packaged and assembled according to an advantageous method of the present invention such that the wheelbarrow 4 is strong, easy to assemble, and has a small packaged size. The hand grips 96 permit a user to pivot the wheelbarrow 4 to a vertical orientation for dumping without a need to remove the hands from the hand grips 96 to readjust the positions of the hands. In addition to the hand grips 96 providing such a useful feature, the bent aspect of the hand grips 96 facilitates the handle members 24 being disposed substantially entirely within the interior 18 of the tray 16 when disassembled.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A method of forming a wheelbarrow comprising:
   repositioning a wheel, a pair of handle members, and a frame subassembly having a pair of riser members pivotably mounted to a frame member from a position disposed substantially entirely within an interior of a wheelbarrow tray to a position disposed substantially at the exterior of the wheelbarrow tray;

pivoting with respect to the frame member the pair of riser members from an initial position to an assembly position;

connecting one of the handle members with the frame member and one of the riser members;

connecting the other of the handle members with the frame member and the other of the riser members;

attaching the wheel to one of the frame member and the pair of riser members; and mounting the wheelbarrow tray to the pair of riser members.

2. The method of claim 1, further comprising removing the wheelbarrow tray, the wheel, the pair of handle members, and the frame subassembly from within a container conforming substantially with the orthogonal dimensions of the wheelbarrow tray.

3. The method of claim 1, further comprising repositioning a cross brace from a position disposed substantially entirely within the interior of the wheelbarrow tray to a position disposed substantially at the exterior of the wheelbarrow tray; and mounting the cross brace to the pair of handle members.

4. The method of claim 1 wherein said attaching the wheel to one of the frame member and the pair of riser members includes mounting the wheel to the pair of riser members.

5. The method of claim 4 wherein said mounting the wheel to the pair of riser members includes mounting an axle between the riser members and mounting the wheel to the axle.

6. The method of claim 1 wherein said mounting the wheelbarrow tray to the pair of riser members includes:
   fastening the wheelbarrow tray to one of the riser members with a first fastener;
   fastening the wheelbarrow tray to the one of the riser members with a second fastener;
   fastening the wheelbarrow tray to the other of the riser members with a third fastener; and
   fastening the wheelbarrow tray to the other of the riser members with a fourth fastener.

7. A method of forming a wheelbarrow comprising:

providing a wheelbarrow tray disposed within an interior of a carton that corresponds substantially with the orthogonal dimensions of the wheelbarrow tray;

providing a wheel, a pair of handle members, and a frame subassembly having a pair of riser members pivotably mounted to a frame member disposed within an interior of the tray within the interior of the carton;

removing from the carton the wheelbarrow tray, the wheel, the pair of handle members, and the frame subassembly;

removing from the wheelbarrow tray the wheel, the pair of handle members, and the frame subassembly;

pivoting with respect to the frame member the pair of riser members from an initial position to an assembly position;

connecting one of the handle members with the frame member and one of the riser members;

connecting the other of the handle members with the frame member and the other of the riser members;

attaching the wheel to one of the frame member and the pair of riser members; and mounting the wheelbarrow tray to the pair of riser members.

8. The method of claim 7, further comprising providing a cross member disposed substantially entirely within the interior of the carton;

removing the cross brace from the wheelbarrow tray; and mounting the cross brace to the pair of handle members.

9. The method of claim 7 wherein said attaching the wheel to one of the frame member and the pair of riser members includes mounting the wheel to the pair of riser members.

10. The method of claim 9 wherein said mounting the wheel to the pair of riser members includes mounting an axle between the riser members and mounting the wheel to the axle.

11. The method of claim 7 wherein said mounting the wheelbarrow tray to the pair of riser members includes:
   fastening the wheelbarrow tray to one of the riser members with a first fastener;
   fastening the wheelbarrow tray to the one of the riser members with a second fastener;
   fastening the wheelbarrow tray to the other of the riser members with a third fastener; and
   fastening the wheelbarrow tray to the other of the riser members with a fourth fastener.

* * * * *